United States Patent [19]

Walter et al.

[11] Patent Number: 5,036,130
[45] Date of Patent: Jul. 30, 1991

[54] TRANSPARENT THERMOPLASTIC MOLDING MATERIAL, ITS PREPARATION AND ITS USE

[75] Inventors: Hans-Michael Walter, Freinsheim; Klaus Bronstert, Carlsberg; Hermann Gausepohl, Mutterstadt; Jüergen Pohrt, Mannheim, all of Fed. Rep. of Germany

[73] Assignee: BASF Aktiengesellschaft, Ludwigshafen, Fed. Rep. of Germany

[21] Appl. No.: 347,438

[22] Filed: May 2, 1989

[30] Foreign Application Priority Data

May 13, 1988 [DE] Fed. Rep. of Germany ....... 3816294

[51] Int. Cl.$^5$ .................. C08L 25/06; C08L 53/02
[52] U.S. Cl. ................................ 524/505; 525/98
[58] Field of Search ..................... 525/98; 524/505

[56] References Cited

U.S. PATENT DOCUMENTS

| 3,639,517 | 2/1972 | Kitchen | 260/879 |
| 4,086,298 | 4/1978 | Fahrbach | 525/122 |
| 4,107,124 | 8/1978 | Himes | 524/445 |
| 4,167,545 | 9/1979 | Fahrbach | 525/122 |
| 4,520,138 | 5/1985 | Himes | 525/99 |

FOREIGN PATENT DOCUMENTS 3738748 11/1987 Fed. Rep. of Germany .
1570404 7/1980 United Kingdom .

Primary Examiner—John C. Bleutge
Assistant Examiner—Davis Buttner
Attorney, Agent, or Firm—Oblon, Spivak, McClelland, Maier & Neustadt

[57] ABSTRACT

A transparent thermoplastic molding material contains, based on A+B,
 A: from 5 to 95% by weight of polystyrene and
 B: from 95 to 5% by weight of a nonelastomeric star block copolymer which is composed of, based on B, $b_1$ from 60 to 95% by weight of styrene and $b_2$ from 5 to 40% by weight of one or more conjugated dienes of 4 or 5 carbon atoms and is prepared in a conventional manner by sequential anionic polymerization using one or more organolithium compounds as an initiator and in the presence of a solvent with subsequent coupling.

In this process, component A is produced by conventional anionic polymerization using one or more organolithium compounds in the presence of an organic solvent.

The molding material is prepared by mixing the components A and B, with or without C, in a conventional manner and is used for the production of moldings.

4 Claims, No Drawings

TRANSPARENT THERMOPLASTIC MOLDING MATERIAL, ITS PREPARATION AND ITS USE

The present invention relates to a transparent thermoplastic molding material containing, based on A+B, A: from 5 to 95% by weight of polystyrene and
B: from 95 to 5% by weight of a nonelastomeric star block copolymer which is composed of, based on B, $b_1$ from 60 to 95% by weight of styrene and $b_2$ from 5 to 40% by weight of one or more conjugated dienes of 4 or 5 carbon atoms and is prepared in a conventional manner by sequential anionic polymerization using one or more organolithium compounds as an initiator and in the presence of a solvent with subsequent coupling.

The relevant prior art includes:
(1) DE-A 19 59 922
(2) DE-A 25 50 226
(3) DE-A 25 20 227
(4) DE-A 26 10 068 and
(5) DE-A 37 38 748.

(1), (2), (3) and (5) describe polymodal star block copolymers of styrene and dienes. (4) discloses transparent blends which consist of polystyrene produced by free radical polymerization and the star block copolymers disclosed in (1) to (3).

The blends disclosed in (4) have clearly detectable disadvantages for the human eye with regard to light transmittance, particularly when used for high quality transparent packaging materials.

It is an object of the present invention to overcome these disadvantages.

We have found that this object is achieved with the aid of a molding material as claimed in claim 1.

The present invention therefore relates to a transparent thermoplastic molding material containing, based on A+B, A: from 5 to 95% by weight of polystyrene and
B: from 95 to 5% by weight of a nonelastomeric star block copolymer which is composed of, based on B, $b_1$ from 60 to 95% by weight of styrene and $b_2$ from 5 to 40% by weight of one or more conjugated dienes of 4 or 5 carbon atoms and is prepared in a conventional manner by sequential anionic polymerization using one or more organolithium compounds as an initiator and in the presence of a solvent with subsequent coupling.

In this molding material, component A is produced by conventional anionic polymerization using one or more organolithium compounds in the presence of an organic solvent.

Surprisingly, when polystyrene prepared by anionic polymerization by means of organolithium compounds is used, the novel molding materials have substantially improved transparency to the eye compared with the molding materials disclosed in (4). The physical measured values are improved by only about 1.5–5%.

The synthesis of the novel molding material from components, the components themselves and their preparation, and the preparation of the molding material, are described below.

The molding material contains the components A and B. It may also consist of these components. With regard to processing, however, it is preferable to use concomitantly to use from 0.01 to 10, preferably from 0.1 to 7.0, parts by weight of conventional additives (component C) per 100 parts by weight of A+B. The molding material contains, based on A+B, from 5 to 95, in particular from 10 to 80, % by weight of A and from 95 to 5, in particular from 90 to 20, % by weight of B.

COMPONENT A

Component A is a polystyrene produced by conventional anionic polymerization and having a narrow molecular weight distribution. The molecular weight distribution in the anionic polymerization is usually substantially narrower than for free radical or thermal polymerization. Usually, the ratio $M_w/M_n \leq 1.1$. The preparation of polystyrene by the anionic method is known per se to the skilled worker (cf. M. Szwarc: Carbanions, Living Polymers, and Electron Transfer Processes, John Wiley Publishers 1968).

For this purpose, styrene is usually polymerized in the presence of an organolithium compound (from 0.01 to 0.2% by weight, based on monomer) of the formula R-Li, where R is an aliphatic, cycloaliphatic or aromatic radical of 1 to 20 carbon atoms, usually in the presence of an inert solvent, for example tetrahydrofuran, or of a solvent based on paraffins, cycloparaffins or aromatics.

Anionic polystyrene is prepared by a procedure similar to that stated for the polymer segments of styrene in the publications (1) to (4) and (5), with the proviso that the amount of styrene intended for achieving a certain molecular weight is added all at once, and polymerization is continued to completion. Thereafter, the reaction (the living anion) is terminated with proton donors, such as alcohols, $H_2O$, etc., in the manner described in (1) to (3) and (5), and the desired product is obtained in a conventional manner.

The molecular weights of component A should be from 50,000 to 800,000; this corresponds to viscosity numbers VN (measured for a 0.5% strength solution in toluene at 23° C.) of from 30 to 350 [ml/g] with molecular weight distributions of from 1.0 to 1.1.

COMPONENT B

Suitable components B are conventional nonelastomeric star block copolymers which are prepared by sequential anionic polymerization using one or more organolithium compounds as an initiator and in the presence of a solvent with subsequent coupling.

The stated block copolymers contain, in particular, from 65 to 90% by weight of styrene and from 35 to 10% by weight of a conjugated diene, in particular butadiene and/or isoprene, the percentages being based on the block copolymer. The viscosity numbers as a measure of the molecular weights of the polymodal star block copolymers are from 65 to 110, preferably from 70 to 95, ml/g (measured for a 0.5% strength solution in toluene at 23° C.). Polymodal star block copolymers which have been prepared as described in German Laid-Open Applications DOS 1,959,922, DOS 2,520,266 and DOS 2,520,262 or publication (5) are preferred.

COMPONENT C

Particularly for certain applications, the novel molding material may contain conventional additives, such as stabilizers, lubricants, antiblocking agents, flameproofing agents and, if transparency is unimportant, also fillers, dyes, pigments, etc., and can be mixed with other thermoplastics, for example PPE, polycarbonate, etc.

Preparation of the Novel Molding Material

The novel molding material can be prepared in a conventional manner in the usual mixing units, such as drum mixers, Brabender mixers, extruders, roll mills, etc., by mixing, for example, granules of components A and B (with or without C) at elevated temperatures. It is also possible to mix the solutions of the components A and B after the end of the anionic polymerization and thereafter to work up the mixture with removal of the solvent in a conventional manner, for example by devolatilization under reduced pressure and at elevated temperatures. Preferably, either component A or component B already contains the additive (component C) required for processing of the mixture (used for deep drawing or injection molding).

The parameters described in the Examples and Comparative Experiments were determined as follows.

1. Viscosity number VN in [ml/g] according to DIN 53,726 at 23° C.

2. Transparency, Tr, in % was determined on 2 mm thick, injection-molded round disks with the aid of a Lange reflectometer with universal measuring unit UME 3, measuring head LT12 and green filter VG9, irradiation taking place at right angles.

The products described below were used for the preparation of the novel molding materials and of samples for Comparative Experiments:

COMPONENT A

Preparation of Polystyrenes $A_1$ and $A_2$ by Anionic Polymerization 7.22 l of cyclohexane and the total amount of styrene were initially taken under inert conditions at 40° C., and the traces of impurities were eliminated by titration with dilute butyllithium solution until a very pale, permanent yellow coloration appeared. The initiator used was a 1.45 normal butyllithium solution in cyclohexane with 8% of n-hexane. After complete conversion (35 minutes), the living polymers were terminated by adding 5 ml of isopropanol, and the resulting polymer was worked up by precipitation from ethanol and subsequent drying of the precipitate (48 hours, 50° C., 10 mbar).

$A_3$: A polystyrene produced by free radical polymerization and having a VN of 96 [ml/g], Commercial product 158 K from BASF AG;

$A_4$: A polystyrene produced by free radical polymerization and having a VN of 74 [ml/g], Commercial product KR 2608 from BASF AG.

COMPONENT B

A star block copolymer consisting of 75% by weight of styrene and 25% by weight of butadiene, prepared according to Example 1 of German Laid-Open Application DOS 2,550,227 and having a VN of 82 [ml/g], was used as component B.

In the Examples and Comparative Experiments which follow, parts and percentages are by weight.

EXAMPLES 1 AND 2 AND COMPARATIVE EXPERIMENTS I AND II

The star block copolymer was mixed with the polystyrenes $A_1$ to $A_4$ in a ZSK 30 extruder (from Werner & Pfleiderer, Stuttgart) at 230° C., in the amounts stated in the Table. The blends obtained were used to produce 2 mm thick round disks, from which the transparency was determined.

TABLE

|  |  | Examples | | Comparative Experiments | |
| --- | --- | --- | --- | --- | --- |
|  |  | 1 | 2 | I | II |
| Polystyrene $A_1$ | [%] | 50 | — | — | — |
| Polystyrene $A_2$ | [%] | — | 50 | — | — |
| Polystyrene $A_3$ | [%] | — | — | 50 | — |
| Polystyrene $A_4$ | [%] | — | — | — | 50 |
| Star block copolymer | [%] | 50 | 50 | 50 | 50 |
| Transparency | [%] | 72.7 | 74.2 | 71.3 | 68.0 |

Although the differences in the numerical values for the transparency are not very great in some cases, even an improvement of about 1.5% means that the light transmittance increases by an amount which is very clearly detectable by the human eye. These small effects play a major role in applications for high quality packaging materials.

We claim:

1. A transparent thermoplastic molding material consisting essentially of, based on A+B,
   A: from 5 to 95% by weight of polystyrene and
   B: from 95 to 5% by weight of a nonelastomeric star block copolymer which is composed of, based on B,
   $b_1$: from 60 to 95% by weight of styrene and
   $b_2$: from 5 to 40% by weight of one or more conjugated dienes of 4 or 5 carbon atoms
   and is prepared in a conventional manner by sequential anionic polymerization using one or more organolithium compounds as an initiator and in the presence of a solvent with subsequent coupling, wherein component A is produced by conventional anionic polymerization using one or more organolithium compounds in the presence of an organic solvent.

2. A molding material as claimed in claim 1, which contains from 0.01 to 10 parts by weight of conventional additives not affecting transparency (component C) per 100 parts by weight of A+B.

3. A molding materials as claimed in claim 1, which contains the components A and B in the following amounts:
   from 10 to 80% by weight of A and
   from 90 to 20% by weight of B.

4. A molding material as claimed in claim 1, wherein component B contains, based in each case on B, $b_1$: from 65 to 90% by weight of styrene and $b_2$: from 35 to 10% by weight of butadiene and/or isoprene.

* * * * *